(12) United States Patent
Pine

(10) Patent No.: US 7,053,942 B2
(45) Date of Patent: May 30, 2006

(54) IMAGING SYSTEM AND METHOD APPLYING TRANSFORMER LENS AND DIGITAL IMAGE RECONSTRUCTION

(75) Inventor: Joshua I. Pine, Seal Beach, CA (US)

(73) Assignee: ESS Technology, Inc., Fremont, CA (US)

( * ) Notice: Subject to any disclaimer, the term of this patent is extended or adjusted under 35 U.S.C. 154(b) by 822 days.

(21) Appl. No.: 09/731,640

(22) Filed: Dec. 7, 2000

(65) Prior Publication Data

US 2002/0071612 A1    Jun. 13, 2002

(51) Int. Cl.
*H04N 9/64* (2006.01)
*H04N 5/225* (2006.01)

(52) U.S. Cl. ...................... 348/246; 348/340
(58) Field of Classification Search ............ 348/335, 348/340, 246; 359/559, 564
See application file for complete search history.

(56) References Cited

U.S. PATENT DOCUMENTS

| | | | | |
|---|---|---|---|---|
| 4,189,751 A | * | 2/1980 | Nagumo | 348/246 |
| 5,181,102 A | * | 1/1993 | Artigalas | 348/206 |
| 5,309,239 A | * | 5/1994 | Bouwhuis | 348/265 |
| 5,461,425 A | * | 10/1995 | Fowler et al. | 348/294 |
| 5,515,112 A | * | 5/1996 | Penney | 348/630 |

OTHER PUBLICATIONS

Fourier optoelectronic signal pre-processor Abdul Wahab and Beng H. Tan, Proc. SPIE Int. Soc. Opt. Eng. 2297, 368 (1994).*
Fourier optical signal processors Flannery, D.L.; Horner, J.L.; Proceedings of the IEEE , vol.: 77 , Issue: 10 , Oct. 1989; pp.: 1511-1527.*
High-Resolution ultrafast eye tracking system Andrew A. Kostrzewski, Anatoly A. Vasiliev, Dai Hyun Kim, and Gajendra D. Savant, Proc. SPIE Int. Soc. Opt. Eng. 3173, 249 (1997).*
"Laser Instruments and Applications" accessed at http://repairfaq.physik.tu-berlin.de/sam/laserlia.htm and printed on Nov. 1, 2000.
U.S. Appl. No. 09/641,406, filed Aug. 17, 2000, Jon Y. Hardeberg.

* cited by examiner

*Primary Examiner*—David Ometz
*Assistant Examiner*—Timothy J. Henn
(74) *Attorney, Agent, or Firm*—Farjami & Farjami LLP

(57) ABSTRACT

An imaging system is provided to minimize pixel defects by capturing an image in the spatial frequency domain. An image processor receives the spatial frequency-domain image data from the imager and transforms the frequency-domain image data into spatial-domain image data. To capture the image in the spatial frequency domain, an optical lens is placed between a spatial representation of an image object and the imager. The optical lens performs an approximate Fourier transform on light emanating from the spatial representation of the image object toward the imager. The image processor performs an approximate inverse Fourier transform on the data received from the imager, restoring the spatial representation of the image.

9 Claims, 4 Drawing Sheets

IMAGING SYSTEM AND METHOD APPLYING TRANSFORMER LENS AND DIGITAL IMAGE RECONSTRUCTION

BACKGROUND OF THE INVENTION

1. Technical Field

The invention relates in general to digital image processing, and in particular to a system for minimizing the visual effect of local pixel defects.

2. Related Art

Pixel defects are a well-known problem in digital photography. A typical digital imager has an array of hundreds of thousands to millions of photocells (i.e., pixels) that produce electrical responses to light exposure. Ideally, each pixel should produce the same electrical response for a given quantity (i.e., intensity and the duration) of light exposure. Usually, however, at least a few of those pixels will be defective. Some isolated photo cells or pixels may produce too much, too little, or even no electrical response at all. As a result, a captured image may have bright or dark point defects.

One method for minimizing pixel defects in an image is to transform the image from the spatial domain to the spatial frequency domain, apply various filters to remove the high frequency components which tend to be associated with point defects, and then convert the image back to the spatial domain. This method of eliminating pixel defects utilizes a great deal of processing power, without utilizing the real-time, cost-effective Fourier-transforming capability of a simple optical device.

SUMMARY

An imaging system is provided to minimize pixel defects by capturing an image in the spatial frequency domain. The imaging system comprises an imager having an array of photocells. Each photocell produces an electrical response to light exposure. The electrical responses of the array of photocells together represent spatial frequency-domain image data. An image processor receives the spatial frequency-domain image data from the imager and transforms the spatial frequency-domain image data into spatial-domain image data. The imaging system further comprises a filter that detects and removes noise from the spatial frequency-domain image data before it is transformed into spatial-domain image data. The imaging system further comprises a user interface that displays the spatial-domain image data.

In another imaging system embodiment, an optical lens is placed between a spatial representation of an image object and the imager. The optical lens performs an approximate Fourier transform on light emanating from the spatial representation of the image object toward the imager. An image processor performs an approximate discrete inverse Fourier transform on the data received from the imager, restoring the spatial representation of the image.

In another imaging system embodiment, a focusing lens and transform lens are placed between the imager and an image object. The focusing lens focuses light onto an image plane between the focusing lens and the transform lens. A transform lens receives the light from the focusing lens and bends it to form a diffraction pattern of the image object at a transform plane of the transform lens. The imager is placed at the transform plane of the transform lens to capture the diffraction pattern of the image object.

The invention also provides a methodology that minimizes point defects in an image. First, a transform lens is placed between an image object and the digital imager. The transform lens performs an approximate Fourier transform on light traveling between the object and the digital imager. Then, the digital imager captures a diffraction pattern of an image object and produces digital spatial frequency-domain image data corresponding to the captured diffraction pattern of the object. The spatial frequency-domain image data is transferred to an image processor, which performs an approximate discrete inverse Fourier transform on the spatial frequency-domain image data, converting it to a spatial domain. Finally, the spatial-domain image data is stored in digital memory or displayed.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
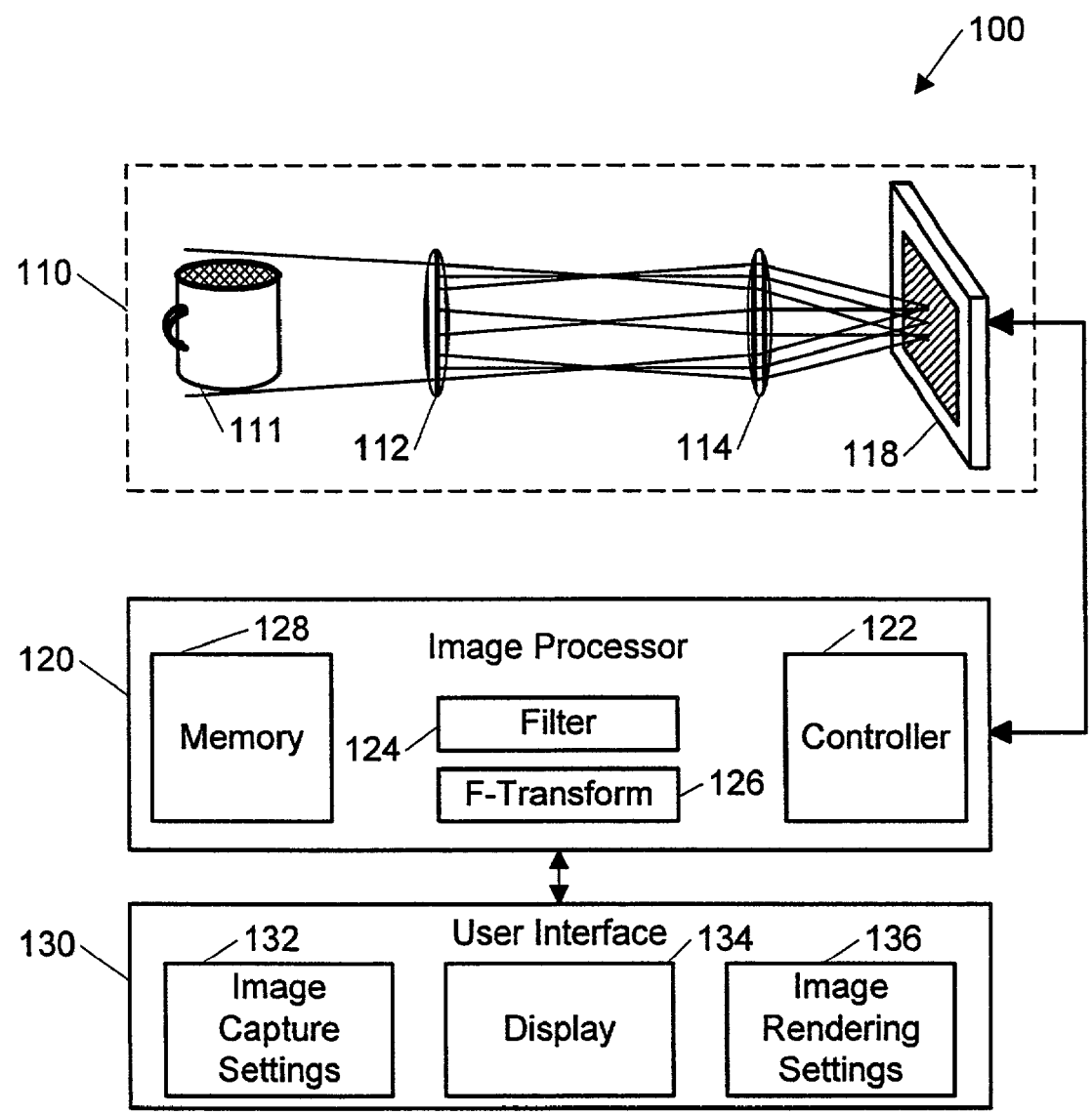
FIG. 1 is a part perspective, part block diagram of an imaging system that minimizes pixel defects by capturing an image in the spatial frequency domain.

FIG. 1 is a diagram of an imaging system 100 that minimizes pixel defects by capturing an image in the spatial frequency domain. The imaging system 100 includes a frequency-domain image-capture setup 110, an image processor 120, and a user interface 130. The frequency-domain image-capture setup 110 comprises an image object 111 (illustrated by a cup), a focusing lens 112 for focusing the image object 111, and a transform lens 114 that forms a diffraction pattern of the image object 111 onto an imager 118. The imager 118 may comprises an array of complimentary metal oxide semiconducting ("CMOS") photocells and circuit elements, captures the diffraction pattern of the image object 111. The imager 118 may also comprise a charged couple device ("CCD"). Each photocell produces an electrical response to light exposure. The electrical responses of the array of photocells together represent the spatial frequency-domain image data of the image object 111. The spatial frequency-domain image data is transferred from the imager 118 to the image processor 120.

The image processor 120 comprises a controller 122 that controls the imager 118, a filter 124 that filters out noise in the image, Fourier transform circuitry 126 that transforms the spatial frequency-domain image data back into the spatial domain, and memory storage 128 that stores the image data. The controller 122 sets the frame rate and length of exposure to which the imager is exposed to an image or sequence of images. The Fourier transform circuitry 126 carries out standard digital processing techniques for computing discrete inverse Fourier transforms, well-known to those of ordinary skill in the art, to transform the captured spatial frequency-domain image data back into the spatial domain. The filter 124 optionally need not be present in the image processor 120, but is incorporated into the illustrated embodiment to enhance the noise and artifact-minimizing features of the present invention. The memory storage 128 comprises any suitable medium for storing digital data, such as random-access memory, flash memory, hard disk memory, optical memory storage, and floppy disk memory.

The user interface 130 comprises image capture setting controls 132, a display 134 and an image rendering setting control 136. The image capture setting controls 132 enables a user to fix the frame rate or the length of exposure of the imager 118 to an image. The image capture setting controls 132 also permit, but optionally need not permit, the user to control lighting conditions, aperture size, and the relative physical positioning of the focusing lens 112, the transform lens 114, and the imager 118.

The display 134 displays the image after the image processor 120 transforms the spatial frequency-domain image data to the spatial domain. The display 134 also displays, but optionally need not display, the diffraction pattern represented by the spatial frequency-domain image data. The image rendering setting controls 136 permits a user to modify parameters that affect the filtering of the image data or the transformation of the image data from the spatial frequency to the spatial domains.

By capturing an image in the spatial frequency domain, spatial information about the image object is spread across multiple photocells. Moreover, each photocell is exposed to light emanating from several different locations on the image object. The effect of a defective photocell is distributed throughout the image and thus minimized. Furthermore, the transform lens 114 performs an approximate real-time Fourier transform of the image data emanating from the image object, without utilizing any digital processing power.

Figure 2:
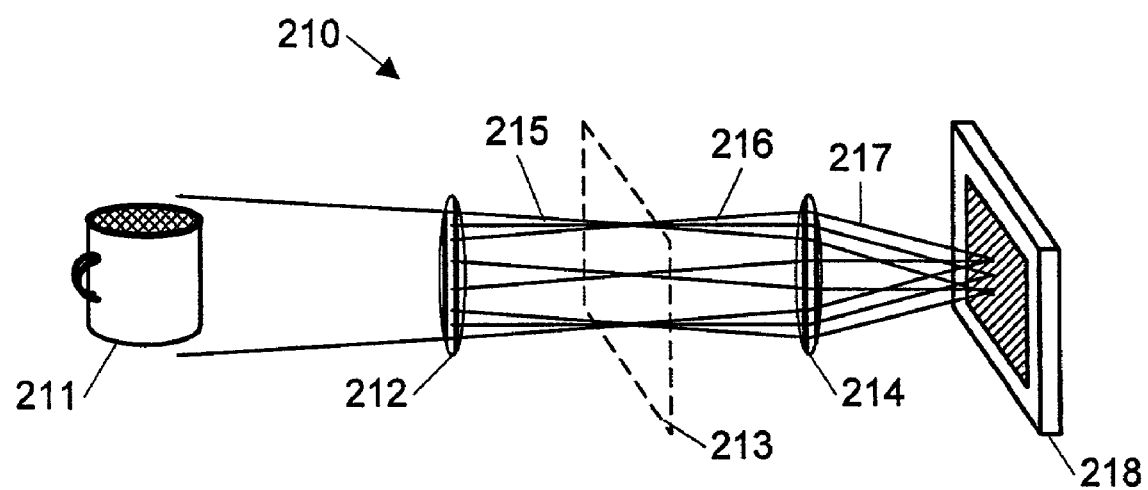
FIG. 2 is a perspective diagram illustrating a frequency-domain image capture setup of the imaging system of FIG. 1.

FIG. 2A is a perspective diagram illustrating a frequency-domain image-capture setup 210 of the imaging system 100 of FIG. 1. The image-capture setup 210 of the imaging system 100 comprises an image object 211, a focusing lens 212, a transform lens 214, and an imager 218. The imager 218 could comprise charge-coupled device components instead of, or in addition to, a complimentary metal oxide semiconductor image sensor. Also, the imager 218 may by part of a still camera or a video camera. Furthermore, the imager 218 may be part of the same multi-chip module package or semiconducting wafer as the image processor 120, or alternatively be located remotely from the image processor 120.

Light emanating from (or reflecting off) the image object 211 enters the focusing lens 212. The light is coherent, but optionally need not be coherent. The focusing lens 212 focuses light from the image object 211 into an image at an image plane 213. The focused light is illustrated by light rays 215. A transform lens 214 is positioned on the other side of the image plane 213. The transform lens 214 is separated from the image plane 213 by a distance equal to the focal length of the transform lens 214. Light rays 216 travel from the image plane 213 to the transform lens 214, where they are bent. Bent light rays 217 then travel from the image plane 214 to the imager 218, that is positioned in the transform plane of the transform lens 214. At this position, the bent light rays 217 form a diffraction pattern of the image object 211.

Figure 3:
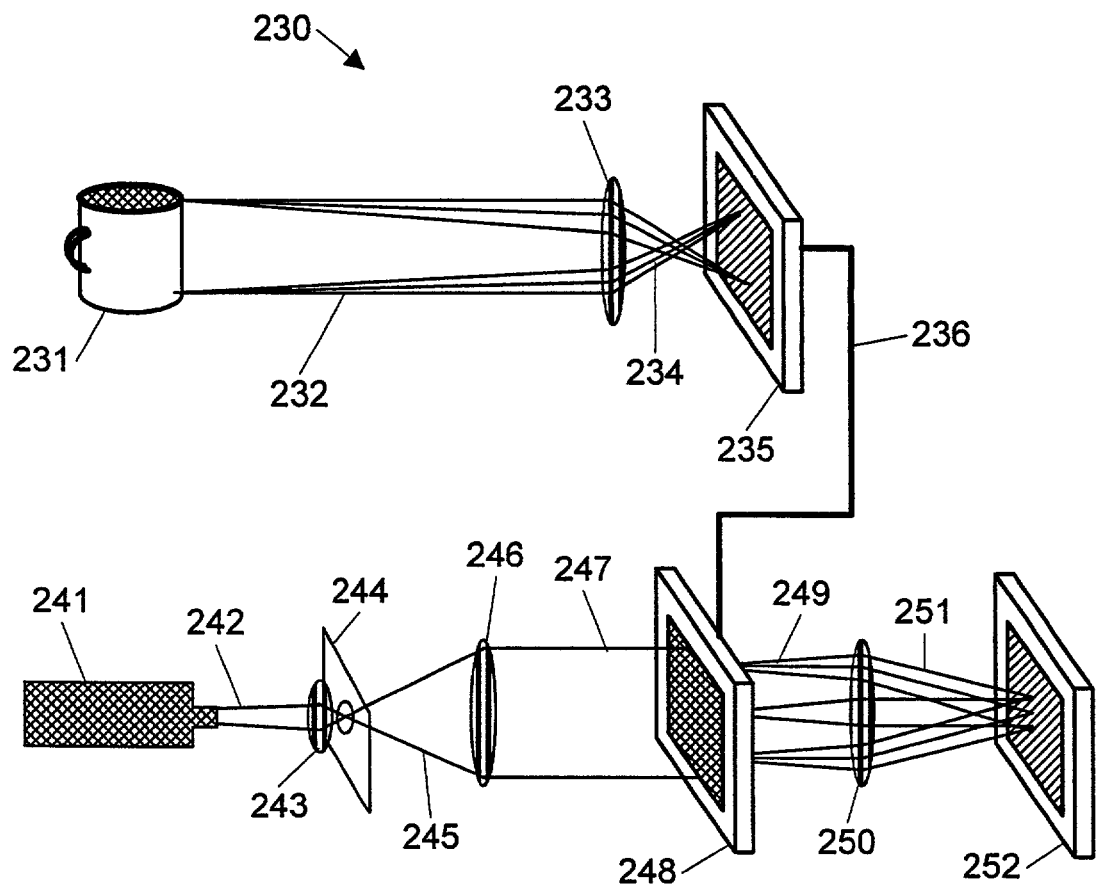
FIG. 3 is a perspective diagram illustrating another frequency-domain image capture setup of the imaging system of FIG. 1.

FIG. 3 is a perspective diagram illustrating a second frequency-domain image-capture setup 230 of the imaging system 100 of FIG. 1. The image-capture setup 230 of the imaging system 100 comprises an image object 231, focusing lenses 233 and 243, first and second imagers 235 and 252, a laser 241, a spatial filter 244, a collimating lens 246, a spatial light modulator 248, and a transform lens 250.

The first imager 235 captures an image of the image object 231 in the spatial domain, much the same way as any conventional camera does. The image object 231 is illuminated by an incoherent light source, that reflects divergent light rays 232 toward the focusing lens 233. The focusing lens 233 converts the divergent light rays 232 into converging rays 234. The converging rays 234 are captured by the first imager 235, which is located in the focal plane of the focusing lens 233. The first imager 235 communicates spatial-domain image data about the image object 231 to the spatial light modulator 248.

The laser 241 produces a relatively straight beam 242 of coherent light. The focusing lens 243 may be a short-focal-length convex lens capable of transforming the straight beam 242 into a divergent beam 245. The purpose of the focusing lens 243 is to widen the laser beam while maintaining an approximate uniformity of light intensity across the cross section of the laser beam. Before the beam 245 diverges, it passes through the spatial filter 244. The spatial filter 244, which comprises a pinhole placed at the focus of the focusing lens 243, cleans up the laser beam 242.

The collimating lens 246 converts the divergent beam 245 into a collimated (i.e., parallel) beam 247 of coherent light. The collimated beam 247 is directed toward the spatial light modulator 248, that is located in the input focal plane of the transform lens 250. The spatial light modulator 248 may comprise light-modulating components familiar to those of ordinary skill in the art, causes diffraction of the collimated beam 247, as would a two-dimensional transparency placed in the same focal plane.

Diffracted light rays 249 emanating from spatial light modulator 248 are transformed by the transform lens 250 into a diffraction pattern at the transform plane (i.e., the output focal plane) of the transform lens 250. The second imager 252 may be placed in the transform plane making it capable of capturing the diffraction pattern of the image object 231 and transmitting the data to an image processor (not shown). The frequency-domain image-capturing setup 230 provides a means of capturing an image of an object illuminated by an incoherent light source in the spatial frequency domain.

Figure 4:
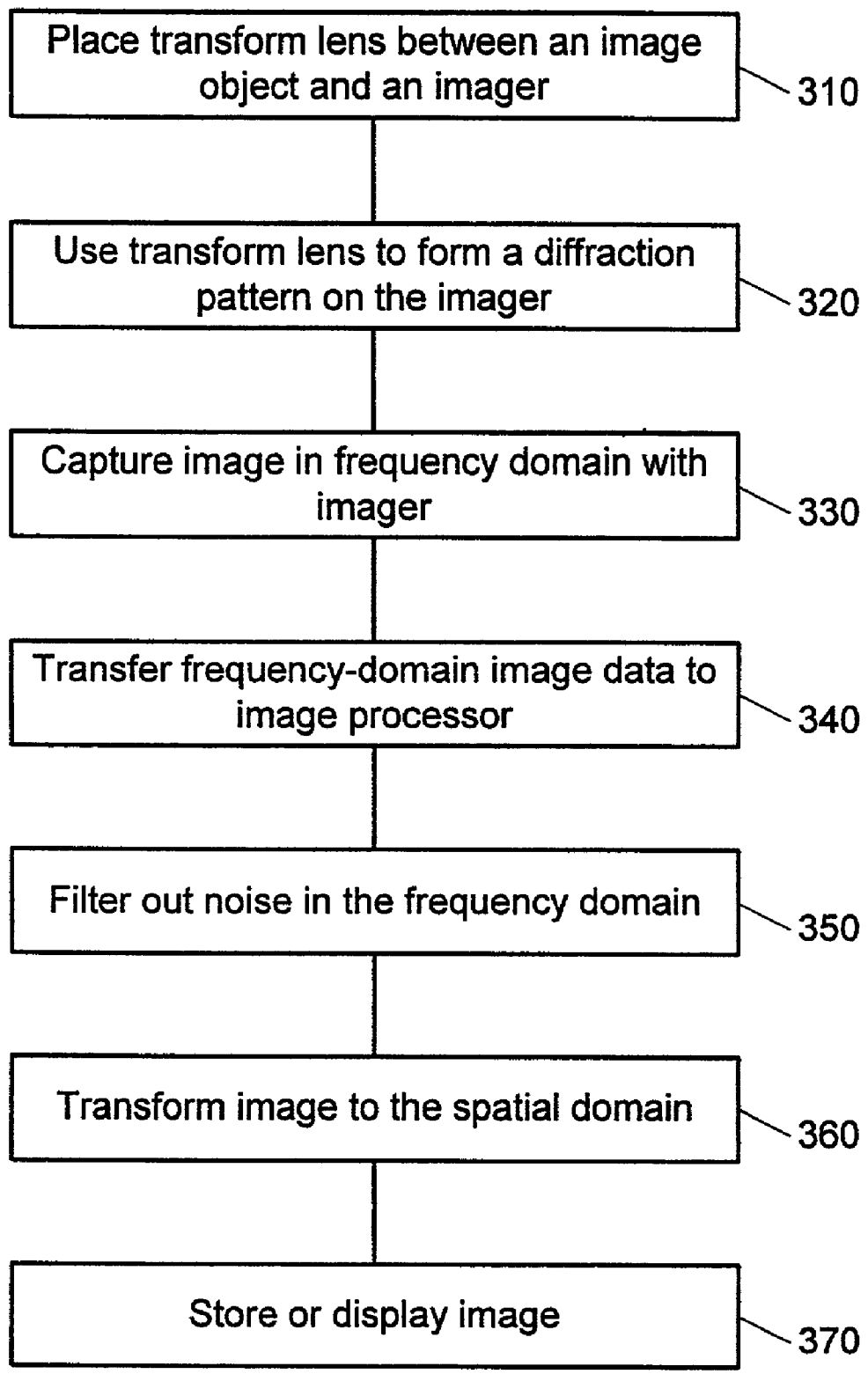
FIG. 4 is a functional flow diagram of a method for capturing an image that minimizes pixel defects.

FIG. 4 is a functional flow diagram of a method for capturing an image that minimizes pixel defects. A transform lens 310, such as a Fourier optic, is placed between an image object and an imager. The transform lens has an input focal plane and an output transform plane. The image object, or a spatial image representation is placed in the input focal plane of the transform lens, and the imager is placed in the transform plane of the transform lens. The transform lens device performs an approximate Fourier transform 320 on light traveling between from the image object to the imager. The imager captures a diffraction pattern 330 of the image object (i.e., captures an image in the spatial frequency domain) and produces spatial frequency-domain image data corresponding with the diffraction pattern. The imager transfers the spatial frequency-domain image data to an image processor 340. The image processor detects and filters out noise detected in the spatial frequency-domain image data 350. The image processor converts the spatial frequency-domain image data into spatial-domain image data 360 using standard discrete inverse Fourier transform techniques familiar to those of ordinary skill in the art. The spatial-domain image data is stored 370 in memory or displayed on a screen, monitor, or other suitable displaying device.

Of course, some of the actions noted in FIG. 4 may be modified or omitted, and other actions not noted added, without departing from many of the inventive aspects of the invention. Moreover, the actions noted in FIG. 4 are not necessarily presented in any strict order.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. An imaging system comprising:
    a first imager configured to capture an image of an object in a spatial domain and generate first spatial-domain image data, wherein the object is illuminated by an incoherent light source;
    a spatial light modulator configured to receive the first spatial-domain image data and a beam of coherent light, and generate diffracted light rays;
    a transform lens configured to transform the diffracted light rays into a diffraction pattern;
    a second imager having an array of photocells, wherein the second imager is configured to capture the diffraction pattern in a spatial frequency domain and generate spatial frequency-domain image data;
    an image processor that receives the spatial frequency-domain image data from the second imager and transforms the spatial frequency-domain image data into a second spatial-domain image; and
    a display configured to display both the second spatial-domain image data and the diffraction pattern.

2. The imaging system of claim 1, where the spatial frequency-domain image data contains noise, the system further comprising a filter that detects and removes the noise before the system transforms the spatial frequency-domain image data into second spatial-domain image data.

3. The imaging system of claim 1, further comprising a user interface that displays both the second spatial-domain image data and the diffraction pattern.

4. The imaging system of claim 1, wherein the transform lens performs an approximate Fourier transform on the diffracted light rays.

5. A method that minimizes point defects in an image, comprising:
    illuminating an object using an incoherent light source;
    capturing a first image of the object in a spatial domain;
    generating first spatial-domain image data;
    using a spatial light modulator configured to receive the first spatial-domain image data and a beam of coherent light, and generate diffracted light rays;
    transforming the diffracted light rays into a diffraction pattern;
    capturing the diffraction pattern in a spatial frequency domain;
    producing spatial frequency-domain image data corresponding to the captured diffraction pattern;
    converting the spatial frequency-domain image data into a second spatial-domain image data; and
    displaying both the second spatial-domain image data and the diffraction pattern.

6. The method of claim 5, further comprising detecting and removing noise from the captured spatial frequency-domain image data.

7. The method of claim 5, further comprising transferring the spatial frequency-domain image data to an image processor, the image processor inverse Fourier transforming the frequency-domain image data into the second spatial domain image data.

8. The method of claim 5, wherein the transforming is achieved by a transform lens performing an approximate Fourier transform on the diffracted light rays.

9. The method of claim 5, further comprising storing the second spatial-domain image data in digital memory.

* * * * *